United States Patent
Davydov et al.

(10) Patent No.: US 8,737,514 B2
(45) Date of Patent: May 27, 2014

(54) CHANNEL STATE INFORMATION FEEDBACK IN COORDINATED MULTI-POINT SYSTEM

(71) Applicant: Intel Corporation, Santa Clara, CA (US)

(72) Inventors: Alexei Vladimirovich Davydov, Nizhni Novgorod (RU); Yuan Zhu, Beijing (CN); Qinghua Li, San Ramon, CA (US); Alexander Alexandrovich Maltsev, Nizhni Novgorod (RU); Gregory Vladimirovich Morozov, Nizhni Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/655,184

(22) Filed: Oct. 18, 2012

(65) Prior Publication Data

US 2013/0114658 A1 May 9, 2013

Related U.S. Application Data

(60) Provisional application No. 61/556,109, filed on Nov. 4, 2011.

(30) Foreign Application Priority Data

Mar. 13, 2012 (WO) ................ PCT/RU2012/000172

(51) Int. Cl.
*H04B 7/02* (2006.01)
(52) U.S. Cl.
USPC ........... 375/267; 375/299; 375/295; 375/259; 375/260; 375/219; 375/220; 375/221

(58) Field of Classification Search
USPC ......... 375/267, 299, 295, 259, 260, 219, 220, 375/221
See application file for complete search history.

(56) References Cited

U.S. PATENT DOCUMENTS

| | | | | |
|---|---|---|---|---|
| 5,852,630 A | * | 12/1998 | Langberg et al. ............. | 375/219 |
| 2012/0076038 A1 | | 3/2012 | Shan et al. | |
| 2013/0083758 A1 | * | 4/2013 | Kim et al. ..................... | 370/329 |
| 2013/0102304 A1 | * | 4/2013 | Lee et al. .................... | 455/422.1 |
| 2013/0107915 A1 | * | 5/2013 | Benjebbour et al. .......... | 375/219 |
| 2013/0114658 A1 | | 5/2013 | Davydov et al. | |

FOREIGN PATENT DOCUMENTS

| | | |
|---|---|---|
| RU | 2009138336 A | 4/2011 |
| WO | WO2010/134792 A2 | 11/2010 |
| WO | WO2012/148478 A1 | 11/2012 |

OTHER PUBLICATIONS

International Search Report and Written Opinion mailed Aug. 9, 2012 from International Application No. PCT/RU2012/000172.
Garcia-Alis et al., "LTE and LTE Advanced," Steepest Ascent, 3GPP Evolution, 2011, pp. 1-16, www.steepestascent.com, Scotland, UK and Los Angeles, CA.

(Continued)

*Primary Examiner* — Siu Lee
(74) *Attorney, Agent, or Firm* — Schwabe, Williamson & Wyatt, P.C.

(57) ABSTRACT

Embodiments of the present disclosure describe devices, methods, computer-readable media and systems configurations for communication of channel state information among network entities. In various embodiments, may calculate first-, second- and third-stage channel state information for nodes of a coordinated multipoint measurement set. Other embodiments may be described and/or claimed.

25 Claims, 5 Drawing Sheets

(56) References Cited

OTHER PUBLICATIONS

3GPP, "Coordinated Multi-Point Operation for LTE-Downlink Core Part," 3GPP Work Item Description, 3GPP Working Procedures, Article 39, 3GPP TR 21.900, Sep. 15, 2011, pp. 1-6.
3GPP, "Coordinated Multi-Point Operation for LTE-Downlink Performance Part," 3GPP Work Item Description, 3GPP Working Procedures, Article 39, 3GPP TR 21.900, Sep. 15, 2011, pp. 1-5.
3GPP, "Coordinated Multi-Point Operation for LTE," 3GPP Work Item Description, 3GPP Working Procedures, Article 39, 3GPP TR 21.900, Sep. 15, 2011, pp. 1-5.
3GPP, "Coordinated Multi-Point Operation for LTE-Uplink Core Part," 3GPP Work Item Description, 3GPP Working Procedures, Article 39, 3GPP TR 21.900, Sep. 15, 2011, pp. 1-6.
3GPP, "Coordinated Multi-Point Operation for LTE-Uplink Performance Part," 3GPP Work Item Description, 3GPP Working Procedures, Article 39, 3GPP TR 21.900, Sep. 15, 2011, pp. 1-5.

* cited by examiner

128

| PMI | Rank | |
|---|---|---|
| | 1 | 2 |
| 0 | (s) | (l,k) |
| 1 | (j) | (s,j) |
| 2 | (k) | (s,l) |
| 3 | (l) | (j,k) |

CHANNEL STATE INFORMATION FEEDBACK IN COORDINATED MULTI-POINT SYSTEM

CROSS REFERENCE TO RELATED APPLICATIONS

The present application claims priority under 35 U.S.C. §365(a) to International Application No. PCT/RU2012/000172, filed Nov. 4, 2011, entitled "Channel State Information Feedback in Coordinated Multi-Point System," and claims priority to U.S. Provisional Patent Application No. 61/556,109, filed Nov. 4, 2011, entitled "Advanced Wireless Communication Systems and Techniques," the entire disclosures of which are hereby incorporated by reference.

FIELD

Embodiments of the present invention relate generally to the field of communications, and more particularly, to channel state information feedback in wireless communication networks.

BACKGROUND

Coordinated multipoint (CoMP) systems have been developed in order to improve various operational parameters in wireless networks. There are three types of CoMP systems: joint transmission (JT); dynamic point selection (DPS); and cooperative scheduling and cooperative beamforming (CS/CB). In JT CoMP, both a serving point, e.g., an enhanced node base station (eNB), and a coordinating point, e.g., another eNB, may send the same data to a user equipment (UE). In DPS CoMP, a transmission point may be dynamically selected among different candidates, e.g., a macro-node eNB and a pico-node eNB. In CS/CB CoMP, coordinating nodes may suppress interference of interfering channels. Interference suppression may be done by orthogonalization of the beam forming vectors to the principal eigenvector of interfering channels. Each of these systems has unique advantages and is adapted for specific use scenarios. However, the operational differences may complicate feedback mechanisms employed by UEs in these systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 3 schematically illustrates a codebook in accordance with various embodiments.

DETAILED DESCRIPTION

Illustrative embodiments of the present disclosure include, but are not limited to, methods, systems, and apparatuses for channel state information feedback in a coordinated multi-point (CoMP) system of wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
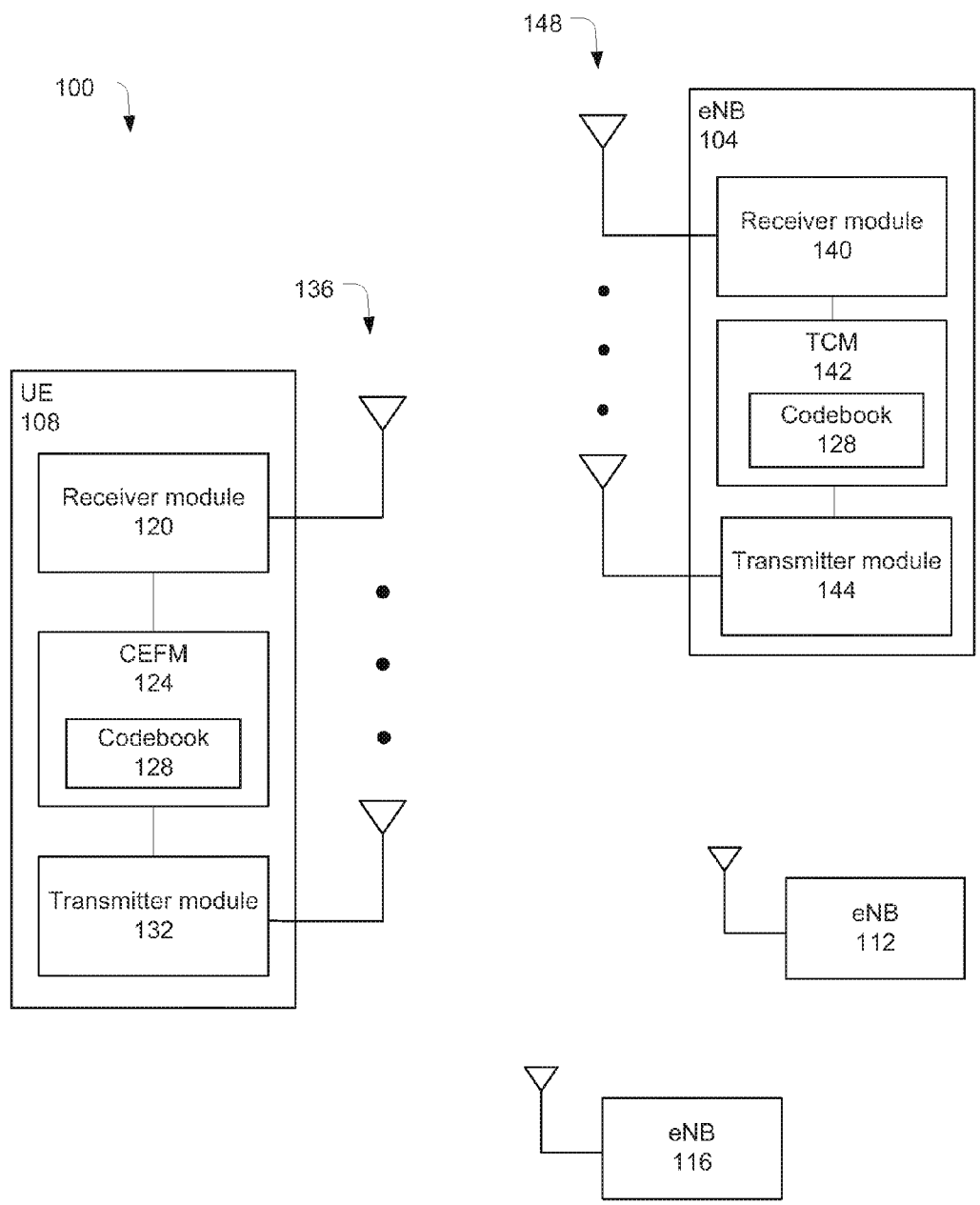
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with user equipment (UE) 108.

At least initially, the eNB 104 may have an established wireless connection with the UE 108 and may operate as a serving node within a CoMP system. One or more additional eNBs of the network 100, e.g., eNBs 112 and 116, may also be included within the CoMP system. eNBs 112 and 116 may be configured to facilitate wireless communication with the UE 108 through coordination with the eNB 104. The one or more additional eNBs may be collectively referred to as "coordinating nodes." An eNB may transition between coordinating and serving node roles.

The serving node and coordinating nodes may communicate with one another over a wireless connection and/or a wired connection (e.g., a high-speed fiber backhaul connection). The CoMP system may be JT CoMP, DPS CoMP, or CS/CB CoMP similar to that described above or combination thereof.

The eNBs may each have generally the same transmission power capabilities as one another or, alternatively, some of the eNBs may have relatively lower transmission power capabilities. For example, in one embodiment the eNB 104 may be a relatively high-power base station such as a macro eNB, while the eNBs 112 and 116 may be relatively low-power base stations, e.g., pico eNBs and/or femto eNBs.

The UE 108 may include a receiver module 120, a channel estimation and feedback module (CEFM) 124 including codebook 128, and a transmitter module 132 coupled with one another at least as shown. The receiver module 120 and transmitter module 132 may each be further coupled with one or more of a plurality of antennas 136 of the UE 108.

The UE 108 may include any number of suitable antennas. In various embodiments, the UE 108 may include at least as many antennas as a number of simultaneous spatial layers or streams received by the UE 108 from the eNBs, although the scope of the present disclosure may not be limited in this respect. The number of simultaneous spatial layers or streams may also be referred to as transmission rank, or simply rank.

One or more of the antennas 136 may be alternately used as transmit or receive antennas. Alternatively, or additionally, one or more of the antennas 136 may be dedicated receive antennas or dedicated transmit antennas.

Figure 3:
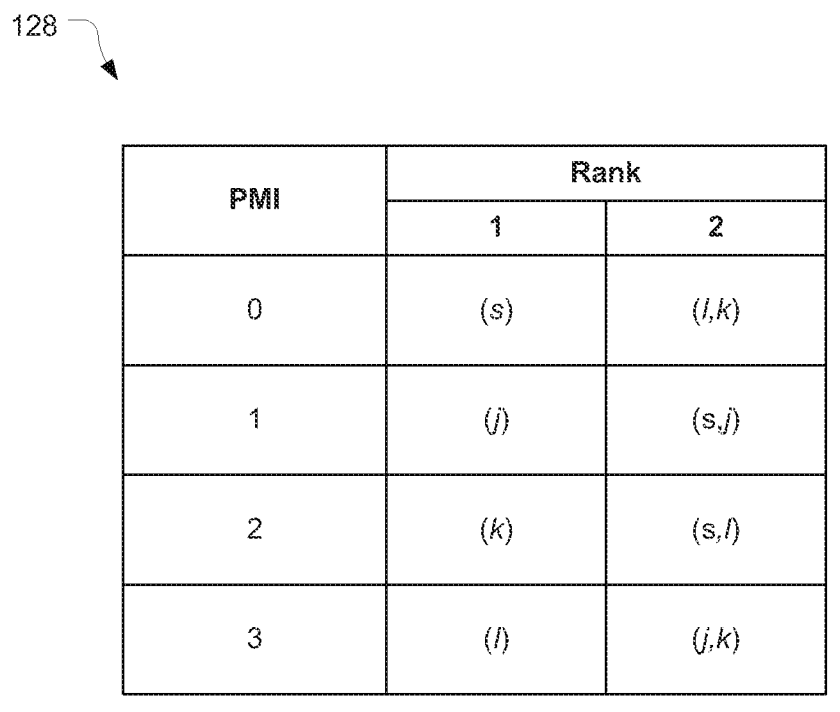

The codebook 128 may include information for a number of possible ranks that may be used for downlink transmissions from one or more of the eNBs to UE 108. An example codebook is shown in FIG. 3 and described in further detail below.

In various embodiments, CEFM 124 may measure aspects of channel conditions, e.g., signal-to-noise plus interference ratio (SINR), fading correlation, etc., based on signals received by the receiver module 120. In some embodiments, the signals may be CSI—reference signals (RS) received from the various nodes of the CoMP measurement set. The CEFM 124 may then feed back channel state information (CSI), via the transmitter module 132, to the serving node based on measured aspects. In some embodiments, the CSI may additionally/alternatively be fed back to one or more of the coordinating nodes.

The channel state information may include precoding matrix indicator (PMI), rank indicator (RI), and/or channel quality indicator (CQI) that may be used to adapt downlink transmissions sent to UE 108. For example, PMI may be an index to a preferred precoding matrix within the codebook 128. The preferred precoding matrix may include one or more precoding vectors that may be used by the eNB 104 to attach a spatial signature to downlink transmissions, such as by applying a beamforming vector. The RI may be used to indicate a desired rank and the CQI may be used to determine modulation and coding scheme (MCS).

Depending on the particular CoMP system employed, it may be desired for different CSI components to be fed back to the eNBs. For example, in DPS CoMP, it may be beneficial for desired rank to be determined separately for each node of the CoMP measurement set, which may include the serving and coordinating nodes. This may be due to the fact that each node of the CoMP measurement set may be selected as a transmission point. For CS/CB CoMP, it may be desirable to restrict CSI reports to rank 1 for each coordinating point so that the coordinating point may suppress interference by orthogonalization of the beamforming vectors to the principal eigenbeam of interfering channels. For JT CoMP, and single user multiple input multiple output (SU-MIMO) JT CoMP in particular, it may be desirable for the CSI report for the coordinating nodes to be the same as that for the serving point.

While each of these CoMP systems have their unique advantages in terms of network performance, their distinctive operations complicate CSI feedback mechanisms that may be used to accommodate each of the systems. Therefore, embodiments described herein provide a common CSI feedback framework that may transparently support the various CoMP systems.

eNB 104 may include receiver module 140, transmit control module (TCM) 142, and transmitter module 144 coupled with one another at least as shown. Receiver module 140 and transmitter module 144 may each be further coupled with one or more of a plurality of antennas 148 of the eNB 104. The eNB 104 may include any number of suitable antennas. In various embodiments, the eNB 104 may include at least as many antennas as a number of simultaneous transmission streams transmitted to the UE 108, although the scope of the present disclosure may not be limited in this respect. One or more of the antennas 148 may be alternately used as transmit or receive antennas. Alternatively, or additionally, one or more of the antennas 148 may be dedicated receive antennas or dedicated transmit antennas.

The TCM 142 may include a copy of codebook 128 to reference information indexed through CSI fed back from the UE 108. The TCM 142 may control the transmitter module 144 to adjust transmission parameters, e.g., applied precoding, modulation and coding scheme (MCS), transmission rank, etc., based on the CSI received from the UE 108. In some embodiments, the TCM 142 may further determine and distribute transmission parameters to the coordinating nodes, e.g., eNBs 112 and 116. In some embodiments, the TCM 142 may additionally/alternatively forward the CSI received from the UE 108 to the coordinating nodes.

Though not shown explicitly, the eNBs 112 and 116 may include modules/components similar to those of the eNB 104.

Figure 2:
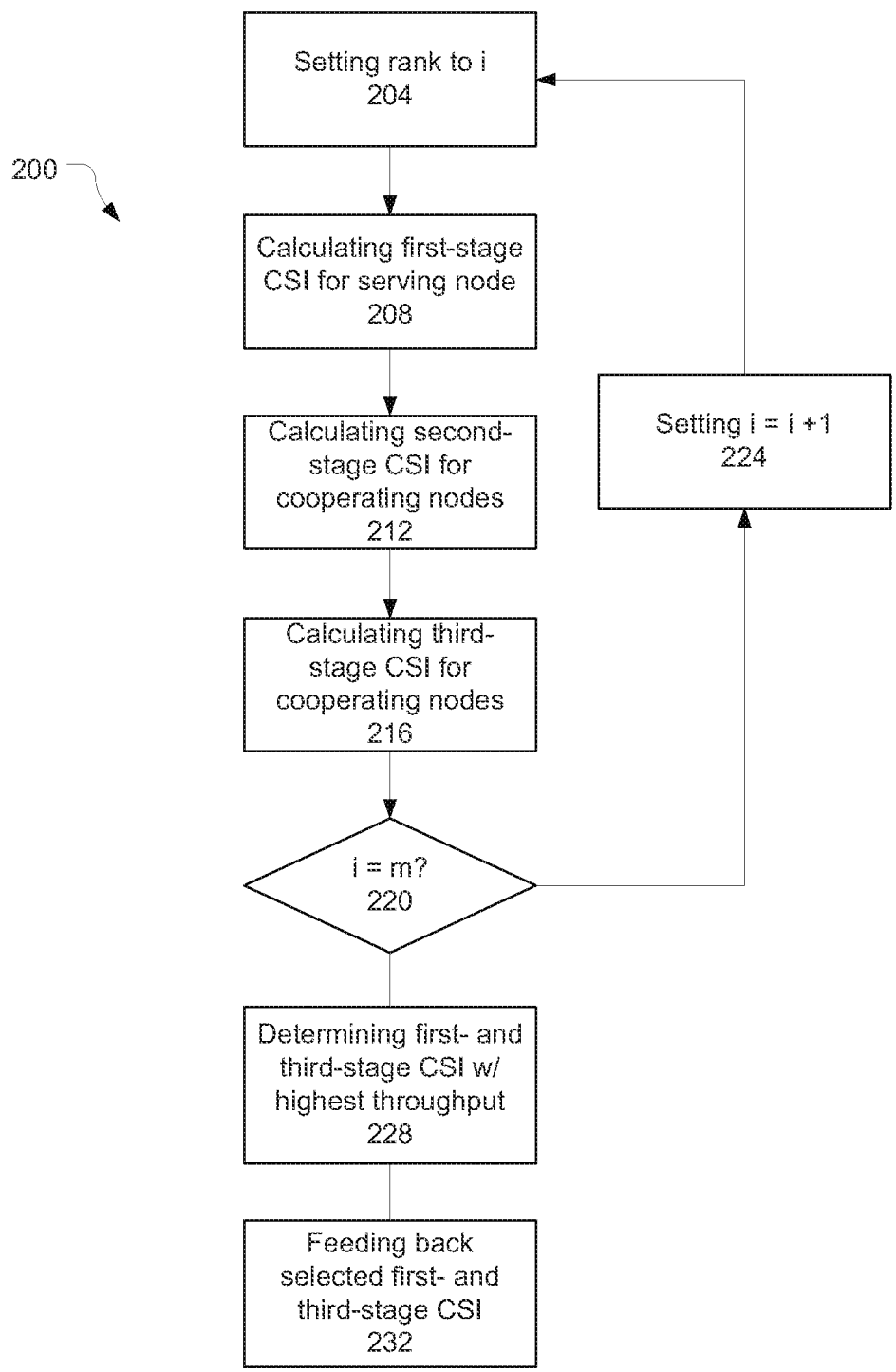
FIG. 2 is a flowchart illustrating a channel state information computation in accordance with various embodiments.

FIG. 2 is a flowchart illustrating a CSI computation 200 of the CEFM 124 in accordance with some embodiments. The CSI computation 200 may begin at block 204 in which a common rank is set for all nodes in CoMP measurement set. The rank may be set to an initial iteration index (i). In some embodiments, the initial iteration index may be 2. However, other embodiments may initialize the iteration index to any other number less than a total number of candidate ranks (m).

The CSI computation 200 may include calculating CSI for serving node at block 208. The CSI calculated at block 208, which may also be referred to as first-stage CSI, may include PMI, CQI, and subband configuration. The CQI may be a measurement of an instantaneous quality of a channel between the UE 108 and the serving node. The PMI and subband configuration may respectively provide a precoding matrix and subband that, by estimation of the CEFM 124, would provide desired transmission characteristics of downlink transmissions sent from the serving node to the UE 108. The subband configuration may be a subset of frequencies of an entire transmission band. The first-stage CSI may be calculated for the common rank set at block 204.

The CSI computation 200 may include calculating second-stage CSI for coordinating nodes at block 212. The second-stage CSI may be calculated for a relatively low rank that is equal to one in some embodiments. In other embodiments, the low rank may be a rank that is less than the relatively high rank set at block 204.

The second-stage CSI may include PMI and CQI for the subband configuration, calculated in block 208, for the coordinating nodes. The CQI may be a measurement of an instantaneous quality of the subband within the channel between the UE 108 and one or more of the coordinating nodes. The PMI of the second-stage CSI may provide the precoding matrix that, by estimation of the CEFM 124, would provide desired transmission characteristics of downlink transmissions sent from the coordinating nodes with the low rank and for the given subband configuration. The second-stage CSI may be calculated based on an assumption that either CS/CB CoMP or JT multi-user- (MU-) MIMO CoMP is employed.

The CSI computation 200 may include calculating third-stage CSI for coordinating nodes at block 216. The third-stage CSI may include PMI and CQI for the subband configuration (calculated in block 208) and common rank (set in block 204) for the coordinating nodes. The CQI of the third-stage CSI may be a measurement of an instantaneous quality of the subband within the channel between the UE 108 and the coordinating nodes. The PMI of the third-stage CSI may provide the precoding matrix that, by estimation of the CEFM 124, would provide desired transmission characteristics of downlink transmissions sent from the coordinating nodes with the common rank and the subband configuration.

The calculation of the third-stage CSI may be based on the second-stage CSI. For example, at least some components of the third-stage CSI may contain, approximate, or otherwise correspond to components of the second-stage CSI. The extension of the second-stage CSI to the third-stage CSI may be carried out using a nested structure of the codebook 128 or, in an event in which the codebook does not include a nested structure, by selecting a codeword of the third-stage CSI such that it includes a component vector that has a correlation with a vector of the second-stage CSI that is greater than a predetermined threshold.

FIG. 3 schematically illustrates codebook 128 to facilitate explanation of the extension of a second-stage CSI to a third-stage CSI in accordance with an embodiment. Consider, e.g., that the second-stage CSI calculated in block 212 includes PMI 0, which corresponds to a rank 1 precoding vector (s). In calculating a third-stage CSI, with the common rank equal to two, the CEFM 124 may select between PMI 1 or 2, both of which include the precoding vector (s). In such a manner, the third-stage CSI may be selected to ensure that it includes the precoding vector of the second-stage CSI.

The codebook 128 shown in FIG. 3 has a nested structure due to the rank 2 precoding vectors including rank 1 precoding vectors. However, in an embodiment in which the codebook 128 is not nested, i.e., the rank 2 precoding vectors do not include rank 1 precoding vectors, the selecting of the PMI may be based on correlation between a component vector of the third-stage CSI and a precoding vector of the second-stage CSI as discussed above.

Blocks 208-216 of the CSI computation 200 may be considered one CSI iteration. In some embodiments, the CSI computation 200 may include repeating the CSI iteration for each candidate rank, i.e., for ranks i . . . m. This is shown, in FIG. 2, by determining whether i=m, in block 220, and, if not, incrementing i by one, in block 224. The common rank may then be re-set in block 204 and the next CSI iteration may proceed.

Once it is determined that the iteration index equals the total number of candidate ranks, the CSI computation 200 may include determining which first- and third-stage CSI, of the various iterations, is associated with the highest throughput of the serving node. This may include determining serving node throughput associated with first- and third-stage CSI from each of the iterations and selecting a value of the first- and third-stage CSI of the iteration that corresponds to the highest relative throughput.

The CSI computation 200 may further include feeding back the first- and third-stage CSI, selected at block 228, to the serving node and/or coordinating nodes at block 232. In particular, the first-stage CSI will be fed back to the serving node and the third-stage CSI will be fed back to the coordinating nodes (either directly or through the serving node).

Providing the third-stage CSI in a manner such that it is based on the second-stage CSI, as described, may provide desired feedback information to the various nodes of the CoMP measurement set regardless of the particular CoMP system that is being implemented. For example, the coordinating nodes in a CS/CB system may have the rank 1 beamforming vectors so that they may properly adjust the principle eigenbeam of the interfering channels. Further, coordinating nodes in a DPS CoMP system may include desired rank/PMI for their particular transmissions in the event they serve as transmission points. Still further, the coordinating nodes in a JT CoMP system may include the same CSI report as the serving node so that they may jointly adapt their transmissions to the UE 108.

CSI feedback calculation at UE side may rely on receive processing weights for UE's antennas. The optimal receive processing weights may depend on propagation channel and PMI assumption for the transmitting node. In some embodiments, CSI may be computed for multiple nodes by independently calculating the receive processing weights at the UE receiving antennas for CSI of each coordinating node. In other embodiments, the receive processing weights at the UE may be kept common (and fixed) for computing CSI feedback of all coordinating nodes. For example, UE 108 may use the receive processing weights corresponding to the CSI of serving node and keep it fixed when computing CSI for other coordinating nodes. Using common receive processing weights may be particularly desirable in an embodiment in which a CS/CB or JT CoMP system is implemented. In various embodiments, an eNB, e.g., eNB 104, may transmit a higher layer signaling message, e.g., radio-resource control (RRC) signaling message, to the CEFM 124 to instruct the UE 108 to perform the calculations based on an common receive processing weights or, alternatively, using independently calculated receive processing weights.

Figure 4:
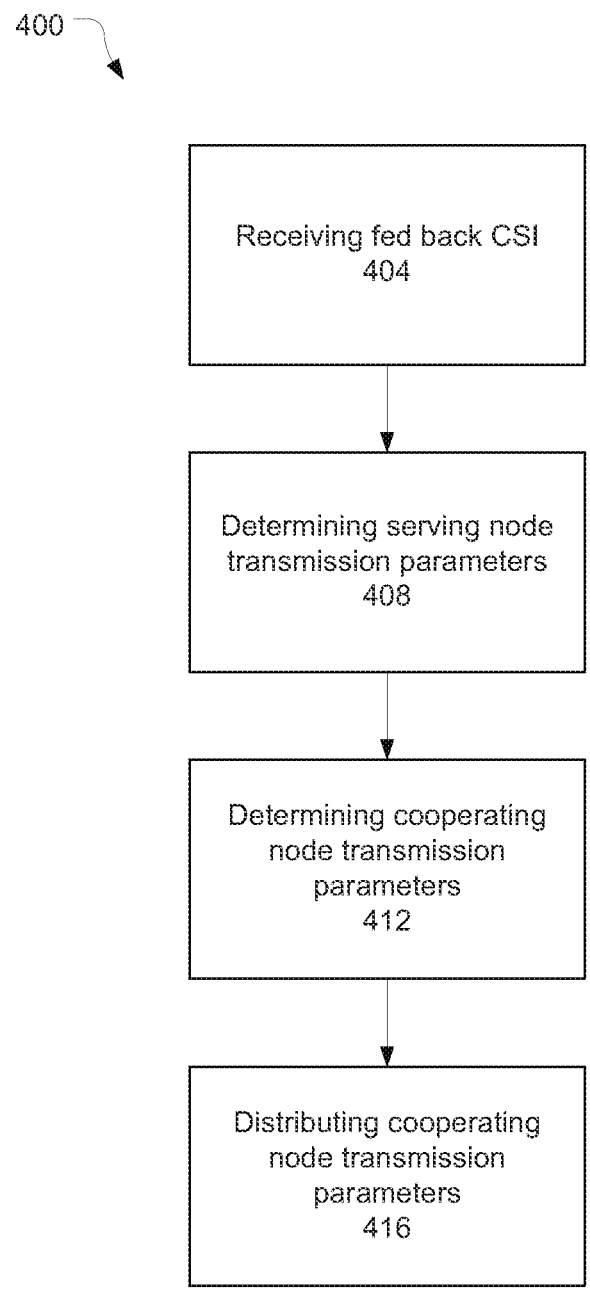
FIG. 4 is a flowchart illustrating a transmission parameter determination in accordance with various embodiments.

FIG. 4 is a flowchart illustrating a transmission parameter determination 400 (hereinafter "determination 400") in accordance with various embodiments. The determination 400 may be performed by the TCM 142 in accordance with some embodiments.

The determination 400 may include receiving the fed back CSI at block 404. The fed back CSI may be the first- and second-stage CSI of the iteration determined by the UE 108 to have the highest associated throughput in block 228.

The determination 400 may include determining serving node transmission parameters at block 408. The transmission parameters may include, e.g., precoding matrix, rank and MCS to be used in downlink transmissions sent to the UE 108 from the serving node, e.g., eNB 104. These transmission parameters may be based on the first-stage CSI fed back from the UE 108.

The determination 400 may include determining cooperating node transmission parameters at block 412. In some embodiments, the TCM 142 may determine transmission parameters that are to be used by the cooperating nodes in downlink transmissions to the UE 108 and/or other UEs. As will be understood in light of the teachings provided herein, the cooperating node transmission parameters may be based on the third-stage CSI fed back from the UE 108 and the particular CoMP system that is being employed.

The determination 400 may further include distributing cooperating node transmission parameters at block 416. The transmission parameters may be distributed to the cooperating nodes through a high-speed backhaul connection or through an over the air interface.

Figure 5:
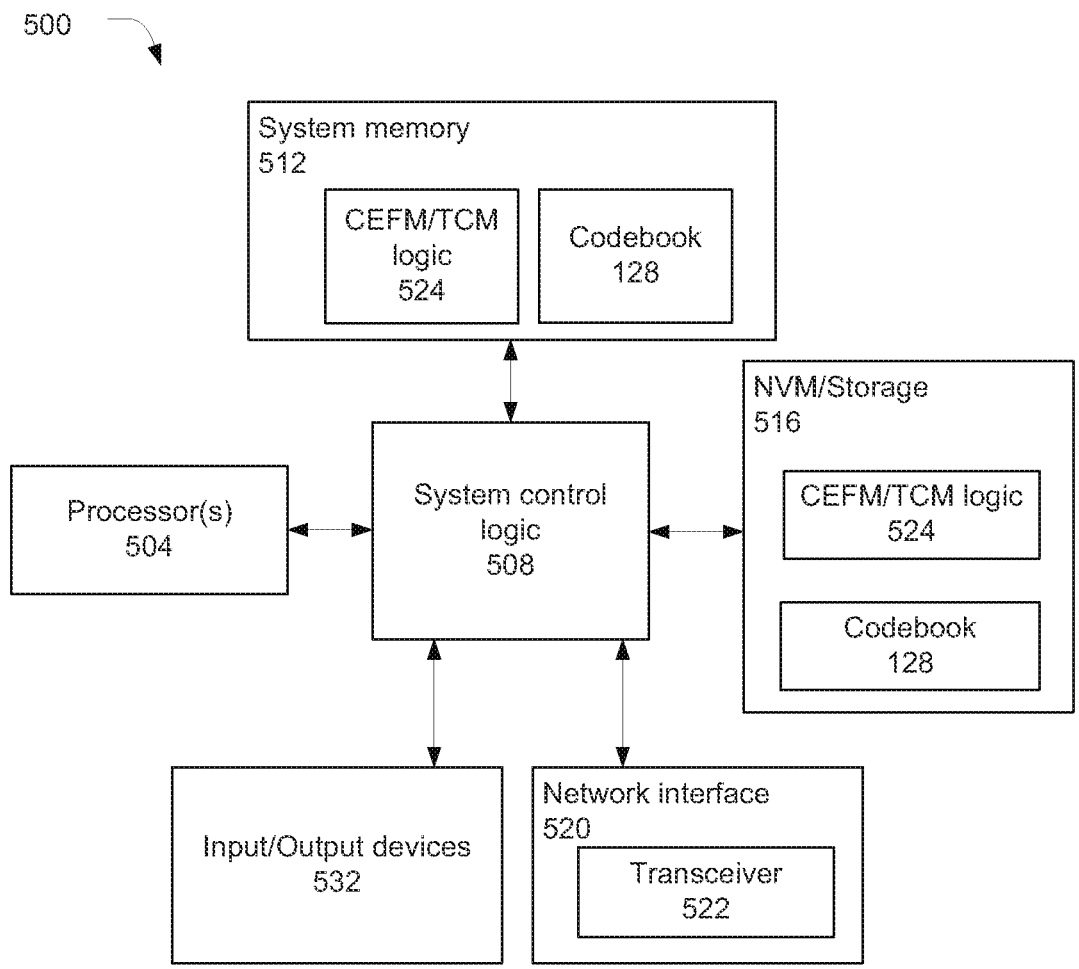
FIG. 5 schematically depicts an example system in accordance with various embodiments.

The eNB 104 and UE 108 described herein may be implemented into a system using any suitable hardware and/or software to configure as desired. FIG. 5 illustrates, for one embodiment, an example system 500 comprising one or more processor(s) 504, system control logic 508 coupled with at least one of the processor(s) 504, system memory 512 coupled with system control logic 508, non-volatile memory (NVM)/storage 516 coupled with system control logic 508, and a network interface 520 coupled with system control logic 508.

The processor(s) 504 may include one or more single-core or multi-core processors. The processor(s) 504 may include any combination of general-purpose processors and dedicated processors (e.g., graphics processors, application processors, etc.).

System control logic 508 for one embodiment may include any suitable interface controllers to provide for any suitable interface to at least one of the processor(s) 504 and/or to any suitable device or component in communication with system control logic 508.

System control logic 508 for one embodiment may include one or more memory controller(s) to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of CEFM/TCM logic 524 and codebook 128. The CEFM/TCM logic 524 may include instructions that when executed by at least one of the processor(s) 504 result in the system 500 implementing a CEFM, e.g., CEFM 124, to perform the CEFM operations or implementing a TCM module, e.g., TCM 142, to perform TCM operations as described herein. In some embodiments, the CEFM/TCM logic 524, or hardware, firmware, and/or software components thereof, may additionally/alternatively be located in the system control logic 508, the network interface 520, and/or the processor(s) 504.

Network interface 520 may have a transceiver 522 to provide a radio interface for system 500 to communicate over one or more network(s) and/or with any other suitable device. The transceiver 522 may be implement receiver module 120 and/or transmitter module 132. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control logic 508. For one embodiment, at least one of the processor(s) 504 may be packaged together with logic for one or more controllers of system control logic 508 to form a System in Package (SiP). For one embodiment, at least one of the processor(s) 504 may be integrated on the same die with logic for one or more controller(s) of system control logic 508. For one embodiment, at least one of the processor(s) 504 may be integrated on the same die with logic for one or more controller(s) of system control logic 508 to form a System on Chip (SoC).

The system 500 may further include input/output (I/O) devices 532. The I/O devices 532 may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a smartphone, etc. In various embodiments, system 500 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:
1. An apparatus comprising:
 a channel estimation and feedback module (CEFM) to:
  set a first rank for a plurality of nodes in coordinated multipoint (CoMP) measurement set, the plurality of nodes including a serving node to wirelessly communicate with a user equipment and one or more coor- dinating nodes to coordinate with the serving node to facilitate wireless communication with the user equipment;

calculate first-stage channel state information (CSI), including a first subband configuration, for the first rank;

calculate second-stage CSI for a second rank based on the first subband configuration, wherein the second rank is less than the first rank; and calculate third-stage CSI for the first subband configuration and the first rank based on the second-stage CSI; and a transmitter module to receive the third-stage CSI from the CEFM and to feed back the third-stage CSI to a selected node of the plurality of nodes.

2. The apparatus of claim 1, wherein the CEFM is to set the first rank equal to each of a number of candidate ranks to provide a plurality of iterations, and is further configured to:

calculate the first-stage, second-stage, and third-stage CSIs for each of the plurality of iterations; and determine throughput associated with the third-stage CSIs from each of the plurality of iterations.

3. The apparatus of claim 2, wherein the CEFM is further configured to:

determine a value of the third-stage CSI from a first iteration of the plurality of iterations corresponds to a highest relative throughput; and select the value for feeding back to the serving node.

4. The apparatus of claim 1, wherein the second rank equals one.

5. The apparatus of claim 1, wherein the CEFM is to calculate the third-stage CSI based on the second-stage CSI by being configured to:

extend the second-stage CSI to the third-stage CSI using a nested codebook structure.

6. The apparatus of claim 1, wherein each of the first-stage, second-stage, and third-stage CSIs include respective precoding matrix indicators (PMIs) and channel quality indications (CQIs).

7. The apparatus of claim 6, wherein a PMI of the second-stage CSI is a single vector and the CEFM is to calculate the third-stage CSI by being configured to:

select a PMI of the third-stage CSI to include the single vector.

8. The apparatus of claim 6, wherein a PMI of the second-stage CSI is a single vector and the CEFM is to calculate the third-stage CSI by being configured to:

select a PMI of the third-stage CSI to include a component vector that has a correlation with the single vector that is greater than a predetermined threshold.

9. The apparatus of claim 1, wherein the selected node is one of the one or more coordinating nodes.

10. The apparatus of claim 1, wherein the CEFM is to receive a signaling message from the serving node instructing the CEFM to calculate first-, second-, and third-stage CSI using receive processing weights for antennas of a user equipment independently calculated for different nodes of the CoMP measurement set.

11. The apparatus of claim 1, wherein the CEFM is to receive a signaling message from the serving node instructing CEFM to calculate first-, second-, and third-stage CSI using receiving processing weights for antennas of a user equipment common to each node of the CoMP measurement set.

12. The apparatus of claim 11, wherein the signaling message is a radio-resource control (RRC) signaling message.

13. The apparatus of claim 1, wherein the first-stage CSI includes a channel quality indicator based on quality of a channel between the user equipment and the serving node.

14. The apparatus of claim 1, wherein the second-stage CSI includes a channel quality indicator based on a quality of a channel between the user equipment and one or more of the cooperating nodes.

15. The apparatus of claim 1, wherein the apparatus comprises the user equipment and further comprises:

one or more antennas configured to feed back the third-stage CSI to the serving node.

16. The apparatus of claim 1, wherein the CEFM is to:

calculate the first-stage CSI for the serving node;

calculate the second-stage CSI for the one or more cooperating nodes; and calculate the third-stage CSI for the one or more cooperating nodes.

17. The apparatus of claim 1, wherein the selected node is the serving node.

18. The apparatus of claim 1, wherein the transmitter module is to receive the first-stage CSI from the CEFM and to feed back the first-stage CSI to the serving node.

19. One or more non-transitory computer-readable media having instructions stored thereon, that, when executed cause a user equipment to:

calculate second-stage channel state information (CSI) for one or more coordinating nodes of a coordinated multi-point (COMP) measurement set based on first rank that is equal to one, the second-stage CSI include a precoding vector, calculate a third-stage CSI for the one or more coordinating nodes based on a second rank that is greater than one, the third-stage CSI to include a plurality of precoding vectors with at least one component vector being the precoding vector or correlating to the precoding vectors;

set a first rank for a plurality of nodes in the CoMP measurement set including the one or more coordinating nodes and a serving node, and calculate, for the serving node, first-stage CSI including a first subband configuration for the first rank.

20. The one or more non-transitory computer-readable media of claim 19, wherein the instructions, when executed, cause the user equipment to:

calculate the second-stage CSI based on the first subband configuration.

21. The one or more non-transitory computer-readable media of claim 19, wherein the instructions, when executed, cause the user equipment to:

calculate the second-stage CSI to include a channel quality indicator based on a quality of a channel between the user equipment and the serving node.

22. An apparatus comprising:

a receiver module configured to receive first and second channel state information (CSI) from user equipment;

a transmit control module (TCM) coupled to the receiver module and configured to:

determine, based on the first CSI, first transmission parameters, including one or more precoding vectors, to be used in downlink communications to the user equipment from a serving node of a coordinated multipoint (CoMP) system; and determine, based on the second CSI and a type of the CoMP system, second transmission parameters, including at least one precoding vector, to be used in downlink communications by one or more coordinating nodes of the CoMP system; and a transmitter module coupled to the TCM and configured to distribute the second transmission parameters to the one or more coordinating nodes.

23. The apparatus of claim 22, wherein the apparatus comprises a base station to operate as the serving node.

24. The apparatus of claim 23, wherein the first and second CSI are for a common rank.

25. The apparatus of claim 22, wherein the transmitter module is to distribute the second transmission parameters via a backhaul connection with the one or more coordinating nodes.

* * * * *